Sept. 9, 1947.  R. J. MILLER  2,427,296
MOTION PICTURE PROJECTOR
Original Filed May 1, 1941    3 Sheets-Sheet 1

INVENTOR.
Raymond J. Miller
BY
*A. E. Wilson*
ATTY.

Sept. 9, 1947.  R. J. MILLER  2,427,296
MOTION PICTURE PROJECTOR
Original Filed May 1, 1941  3 Sheets-Sheet 2

INVENTOR.
Raymond J. Miller
BY A. E. Wilson
ATTY.

Sept. 9, 1947.  R. J. MILLER  2,427,296

MOTION PICTURE PROJECTOR

Original Filed May 1, 1941  3 Sheets-Sheet 3

Raymond J. Miller INVENTOR.
BY
A. E. Wilson.
ATTY.

Patented Sept. 9, 1947

2,427,296

UNITED STATES PATENT OFFICE 2,427,296

MOTION-PICTURE PROJECTOR

Raymond J. Miller, Detroit, Mich., assignor to American Pattern and Manufacturing Co., a copartnership consisting of Raymond J. Miller, and Alfred E. Wilson, Detroit, Mich.

Original application May 1, 1941, Serial No. 391,258, now Patent No. 2,374,828, dated May 1, 1945. Divided and this application July 29, 1944, Serial No. 547,164

12 Claims. (Cl. 88—17)

This invention relates to motion picture projectors and more particularly to an improved mounting for adjustably securing an aperture plate to a movable carrier arm.

In the operation of motion picture projectors, independent visual images carried by a strip of film of any suitable material are successively aligned with an aperture in a plate and are projected onto a screen by a light directed through the aperture and film.

Means such for example as an aperture pressure plate having a plurality of spaced film engaging members or shoes may be provided to yieldingly urge the film into engagement with spaced film tracks positioned adjacent the aperture.

It is desirable that the aperture pressure plate and film shoe guide plate be so mounted in a pressure plate housing that they can be separated from the aperture plate and film tracks to enable the operator to thread film into the projector. To facilitate manufacture of the projector and also to improve its operation by compensating for wear, it is desirable that the film shoe guide plate and the pressure plate be vertically and horizontally adjustable relative to the aperture plate, film tracks and the film driving means employed to intermittently align successive film frames with the aperture.

An object of this invention therefore resides in the provision of vertically and horizontally adjustable means to vary the position of the film shoe guide and pressure plates relative to the film tracks and the intermittently driven sprocket employed to align successive film frames with the aperture.

Still a further object of the invention is to provide readily accessible manually operable means whereby the pressure plate and its associated housing may be removed from its carrier for cleaning, inspection or repair without disturbing the adjustment of the film shoe guide plate relative to the film guiding and driving means.

Another object is to provide vertically and horizontally adjustable mounting means for detachably connecting a pressure plate housing to a carrier arm in such a manner that the position of film guide shoes relative to film tracks can be varied, and the contact position of a film guide shoe relative to an intermittently driven sprocket may be readily adjusted.

Another object is to provide a projector having simplified and rugged film guiding means which may be economically manufactured.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Figure 1:
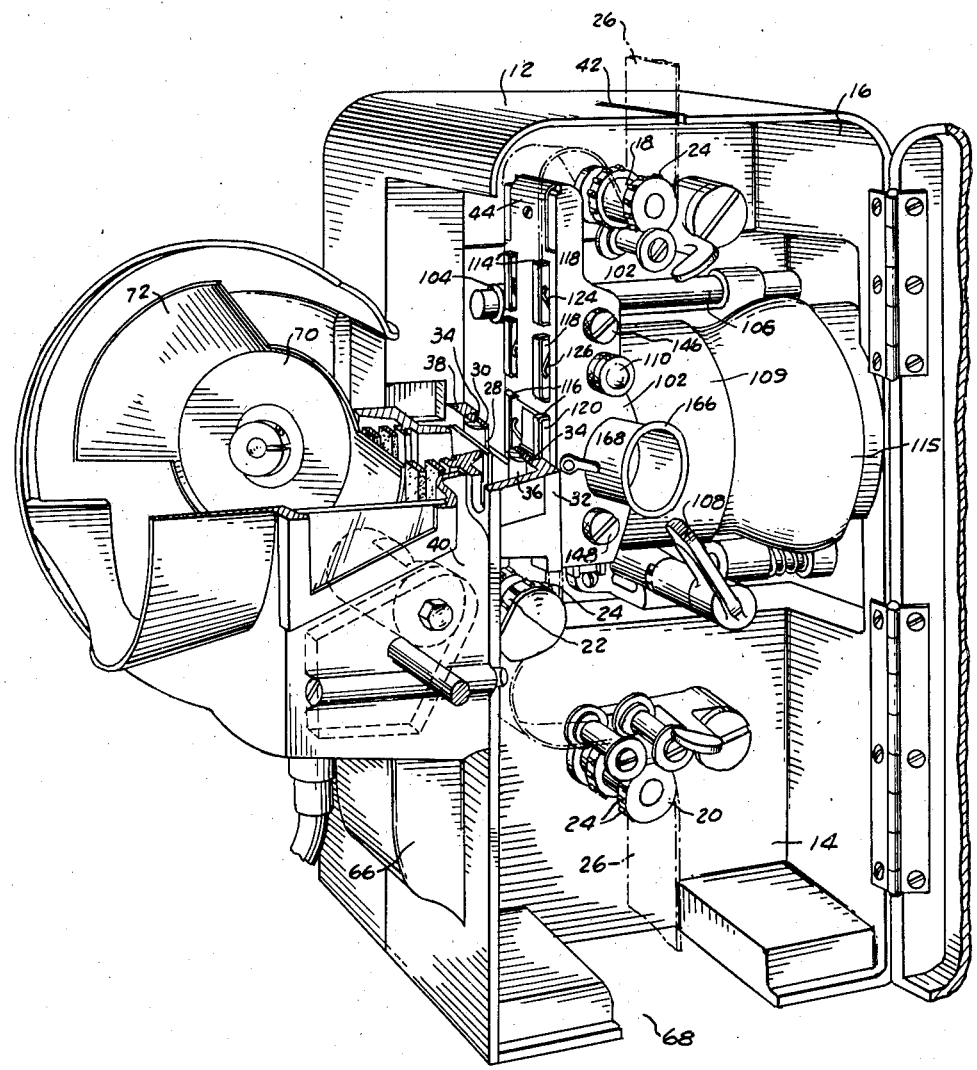
Fig. 1 is a perspective view of a motion picture projector embodying the present invention.
Figure 2:
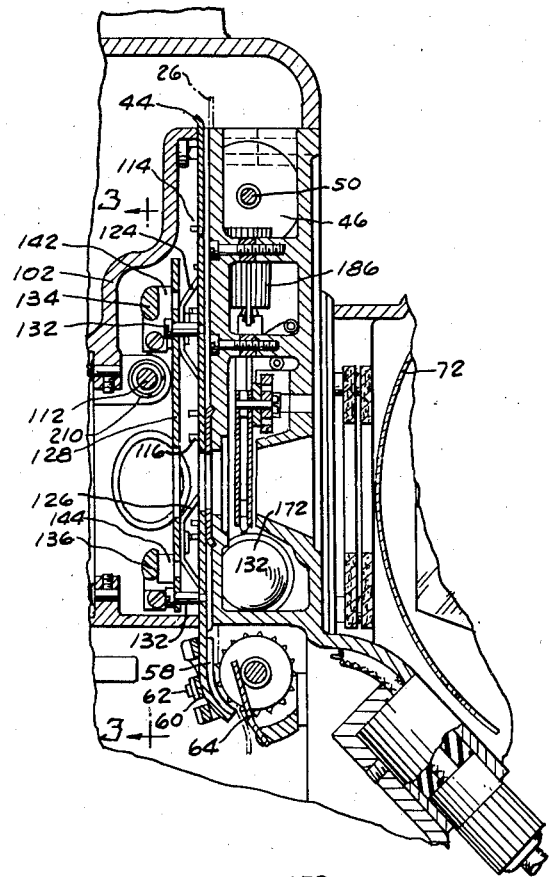
Fig. 2 is a longitudinal sectional view of the projector through the aperture pressure plate.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be observed that the invention is illustrated as being embodied in a motion picture projector having a main casing 12. The space within the casing 12 is preferably divided by a substantially vertically extending intermediate wall 14 into a film compartment 16 and a mechanism compartment.

Upper and lower film driving sprockets 18 and 20 and an intermittently driven sprocket 22 project through the intermediate wall 14 and are provided with radially extending sprocket teeth 24 adapted to engage within spaced apertures in film 26 to drive it. The sprockets 18 and 20 are driven by suitable gearing in the mechanism compartment to move the film at a substantially predetermined speed. The intermittently driven sprocket 22 is driven from the mechanism compartment by a suitable intermittence driving mechanism to momentarily align successive film frames with an aperture 28 formed in an aperture plate 30 carried by an aperture plate housing 32.

The aperture plate 30 is preferably supported between film tracks 34 and film track carrier 36 aligned with the aperture plate housing 32 and with a wall 38 extending transversely from the intermediate wall 14 and spaced forwardly from a back wall 40 of the main casing 12.

The film 26 is drawn into the film compartment 16 through a slot 42 formed in the upper wall of the casing 12 by the upper film driving sprocket 18. After leaving the sprocket 18 the film is directed over the top of a shoe guide plate 44 between film guide rollers 46 and 48 mounted on a shaft 50 carried by bosses 52 and 54 associated with the aperture plate housing 32. The film 26 is then intermittently moved downwardly by the intermittently driven sprocket 22 to momentarily align successive film frames with the aperture 28.

The film 26 is maintained in contact with the sprocket teeth 24 of the intermittently driven sprocket 22 by a film tension shoe 56 which comprises an intermittence sprocket shoe 58 so proportioned as to follow the general contour of the intermittently driven sprocket 22 and maintain the film in engagement with the sprocket teeth 24.

Means such for example as a spring 60 may be provided to yieldingly urge the intermittence sprocket shoe 58 towards the intermittently driven sprocket 22 to exert sufficient pressure on the film 26 to prevent disengagement of the film from the sprocket teeth 24. The spring 60 may be adjustably mounted on a screw 62 threaded into the film shoe guide plate 44 whereby the pressure exerted on the film by the intermittence sprocket shoe 58 can be varied to maintain the film under a desired tension. A stripper plate 64 may be provided to prevent the film 26 from winding up on the sprocket 22 in the event of film breakage.

After leaving the sprocket 22 the film preferably forms a backwardly directed loop extending into an outwardly flared portion 66 of the back wall 40. The film is then directed over the lower film driving sprocket 20 and is discharged from the film compartment 16 through an opening 68 preferably communicating with a sound head.

Projecting light is directed towards the aperture 28 from a suitable light source preferably positioned behind the projector. A shutter of any suitable form such for example as a rotatable member 70 having angularly inclined blades 72 may be provided to intermittently interrupt the flow of projecting light into the film compartment 16 to prevent streaking as successive frames of the film 26 are moved into alignment with the aperture 28 and to prevent visible flicker.

The shoe guide plate 44 is mounted in a pressure plate housing 102 mounted on a carrier arm 104. The carrier arm 104 is slidably mounted on a plurality of vertically spaced generally horizontal disposed rods 106 extending longitudinally in the film compartment 16 and attached to the intermediate wall 14.

Motion transmitting means controlled by a lever 108 positioned between the housing 102 and a fixed portion of the projector may be provided to move the pressure plate housing 102 and the pressure shoe guide plate 44 away from the aperture plate 30 and film tracks 34 to enable the operator to thread film into the projector. A telescoping light shield in the form of a ring 109 mounted on studs 111 carried by the housing 102 may be yieldingly urged by springs 113 towards a lens tube 115 to enable the housing 102 to separate from the aperture plate 30 to permit the operator to thread film into the projector and to facilitate removal of the pressure plate housing from the film compartment. The lens tube 115 is supported on a plurality of the vertically spaced horizontally extending rods 106 by a lens tube carrier arm 117.

A knob 110 carried by a locking shaft 112 may be provided to project through the pressure plate housing 102 to enable the operator to readily remove the pressure plate housing 102 and shoe guide and pressure plates from the carrier arm 104 to clean or adjust them.

A plurality of vertically spaced relatively small film engaging shoes 114 and 116 may be provided to yieldingly urge the film 26 into engagement with the film tracks 34 to maintain the film in a substantially predetermined spaced relation relative to the aperture 28. The film engaging shoes 114 and 116 project through slots 118 and 120 formed in the shoe guide plate 44 and are provided with laterally extending projections 122 which prevent the shoes from passing completely through the slots 118 and 120.

Means may be provided to vary the pressure exerted on the film by each of the film engaging shoes. One illustrative example of a mechanism for varying the pressure exerted by spaced shoes comprises a pressure plate 128 floatingly mounted relative to the shoe guide plate 44 and having independent vertically spaced springs such as those illustrated at 124 and 126 interposed between the pressure plate 128 and each of the film engaging shoes 114 and 116. The springs 124 and 126 may be operably connected to the pressure plate 128 by suitable screws 130. The pressure plate 128 is thus resiliently mounted on the shoe guide plate 44 and is guided by screws 132 in such a manner that the pressure plate can vary its position angularly to equalize the pressure exerted by the springs on each side of the shoe guide plate 44.

Means may be provided to independently vary the pressure exerted on the film by the vertically spaced film engaging shoes 114 and 116. One desirable form of such pressure varying means comprises cam members 134 and 136 carried by vertically spaced shafts 138 and 140 journalled in the pressure plate housing 102 and engaging vertically spaced cam followers 142 and 144 carried by the pressure plate 128. The shafts 138 and 140 project beyond the outer edge of the pressure plate housing 102 and are provided with knobs 146 and 148 whereby they may be independently rotated to vary the pressure exerted by the vertically spaced shoes 114 and 116. The shafts 138 and 140 may be formed with serrated end portions 150 adapted to be engaged by a spring pressed locking clip 152 to prevent the shafts from rotating to vary the pressure exerted on the shoes until subjected to a substantially predetermined manual rotating force.

Attention is called to the fact that the unsprung weight of the film engaging shoes 114 and 116 is minimized because a relatively large number of relatively small and light shoes are employed. Each of the shoes is yieldingly urged towards the film tracks 34 by its individual spring so that any disturbance caused by the film is not transmitted to the next shoe. Such disturbance of the film may be caused by a variation in thickness of film or by the presence of a splice in the film where two pieces of film have been joined together. When this splice passes through between the film engaging shoes and the film tracks it is necessary for the shoes to move away from the tracks to allow the splice to pass. Thus it will be seen that if the unsprung weight of the film engaging shoes is low they will recover their original position more rapidly than if the unsprung weight of the shoes were high. Also, it will allow the patch to pass through with less resistance since the inertia is low. It will be noted that only one pair of shoes is effected at a time by the patch while the remaining shoes are performing their function uninterrupted. This all goes to produce a steadier alignment of the film resulting in a minimum disturbance of the picture on the screen.

It will be noted that it is possible to vary the pressure exerted on the film by the upper and lower film engaging shoes 114 and 116 respectively. For example, the lower shoes 116 positioned closer to the intermittently driven sprocket 22 may be adjusted to exert greater pressure on the film 26 than the upper film engaging shoes 114 to give more stabilized control of the film.

Means may be provided to mount the pressure plate housing 102 on the housing carrier arm 104 in such a manner that it may be adjusted vertically and horizontally to properly align it with the aperture plate housing 32.

Figure 3:
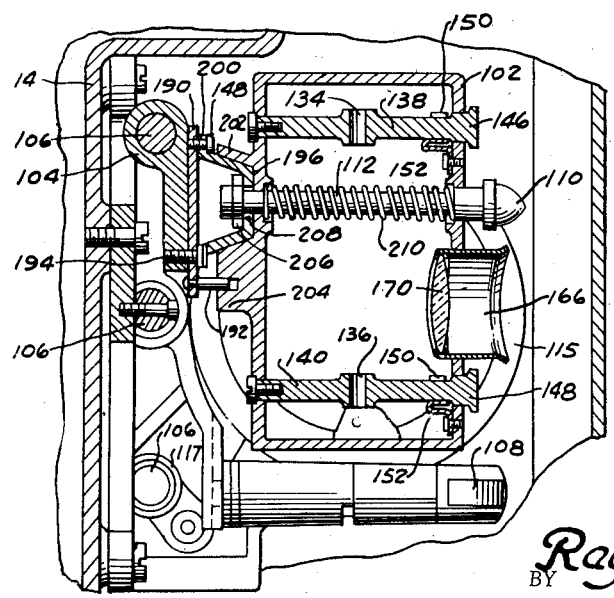
Fig. 3 is a sectional view taken substantially on the line 3—3 of Fig. 2 looking in the direction of the arrows.
Figure 4:
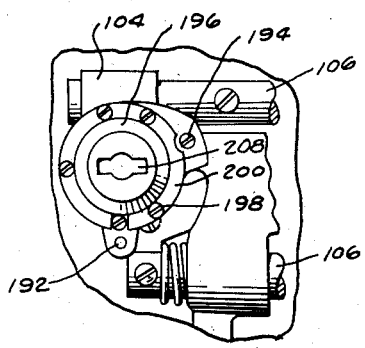
Fig. 4 is a fragmentary elevational view of the bracket illustrated in Fig. 3 for adjustably attaching the pressure plate housing to a carrier arm.

One desirable form of such adjustable mounting means comprises an adjustable locking device more clearly shown in Figs. 3 and 4. The arrangement of the parts is such as to permit ready removal of the pressure plate housing 102 as a unit from the film compartment 16 of the projector.

The carrier arm 104 is provided with a plate 190 having a laterally extending pin 192 projecting therefrom. The plate 190 may be secured to the arm 104 by a plurality of screws 194 projecting through generally arcuate shaped slots in the plate 190 whereby the plate may be rotated slightly relative to the arm 104 to adjust the vertical position of the pressure plate housing 102 relative to the aperture plate housing 32.

A male cone 196 may be secured to the plate 190 by a plurality of screws 198 projecting through vertically extending slots in a flange 200 carried by the male cone 196 whereby the cone can be elevated or lowered slightly relative to the plate 190 to adjust the contact position of the intermittence sprocket shoe 58 relative to the intermittently driven sprocket 22.

The pressure plate housing 102 is provided with a laterally extending female cone 202 adapted to receive the male cone 196 and is also provided with an apertured boss 204 adapted to receive the pin 192.

The pressure plate housing 102 may be locked and unlocked in position on the male cone 196 by a locking key 206 carried by the locking shaft 112 and adapted to project inside the male cone 196 through a slot 208. The locking key 206 is actuated by the locking shaft 112 having the actuating knob 110 and is maintained in locking position by the tension of a spring 210.

Frequent removal of the pressure plate housing 102 is desirable in order to permit cleaning of the pressure plate; housing and the film tracks and shoes. The removal of the aperture pressure plate housing as a unit is accomplished by turning the locking key 206 from the vertical position to the horizontal position so that it is aligned with the slot 208. In this position the locking key 206 can be withdrawn and the entire pressure plate housing 102 may then be removed from the male cone 196.

In replacing the pressure plate housing, primary adjustment is obtained by the guide pin 192 carried by the plate 190 entering the aperture of the boss 204. Complete alignment is obtained by contact of the female cone 202 with the male cone 196. The actuating knob 110 of the locking shaft 112 having the locking key 206 is then pressed inwardly to compress the spring 210 until the locking key 206 projects through the slot 208 and occupies a position inside the male cone 196. The knob 110 is then rotated 90° and the locking key 206 fits into shallow grooves on the inside of the male cone 196 as illustrated by the position occupied by the locking key 206 of Fig. 3. When the key 206 is moved to the locked position the knob 110 is released whereupon the spring 210 holds the parts securely in the assembled position because the pressure plate housing 102 is firmly supported and aligned at vertically spaced points on the cooperating cones 196 and 202 and by the pin 192 and apertured boss 204.

Figure 5:
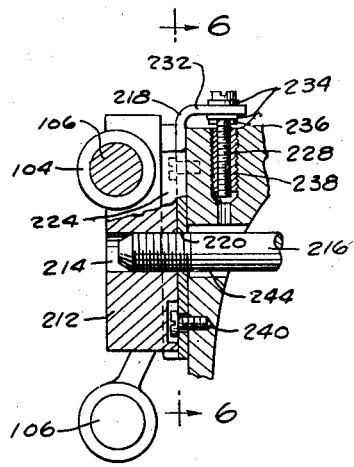
Fig. 5 is a fragmentary sectional view of a modified form of attaching bracket.
Figure 6:
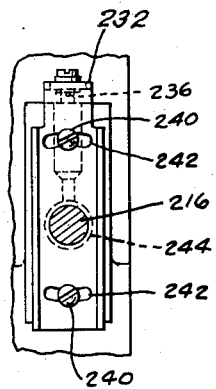
Fig. 6 is a sectional view taken substantially on the line 6—6 of Fig. 5 looking in the direction of the arrows.
Figure 7:
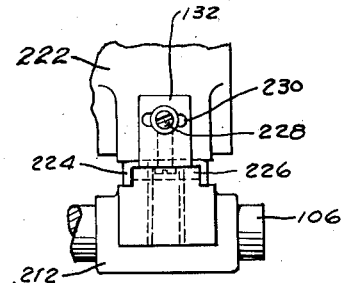
Fig. 7 is a top plan view of the attaching bracket illustrated in Figs. 5 and 6.

Figs. 5 to 7 disclose a modified form of adjustable means for mounting the pressure plate housing 102 on the vertically spaced horizontally extending rods 106 in the film compartment 16.

A carrier arm 212 slidably mounted on a plurality of the vertically spaced rods 106 is provided with a threaded aperture 214 to receive a locking shaft 216. A plate 218 having an aperture 220 to receive the shaft 216 in close contact therewith is interposed between the carrier arm 212 and a body section 222 of the pressure plate housing 102. The plate 218 is channel shaped and is provided with spaced flanges 224 positioned to engage the marginal edge portions 226 of the carrier arm 212 to maintain the pressure plate housing 102 in a predetermined adjusted position relative to the film tracks 34 and the intermittently driven sprocket 22.

Means may be provided to vary the vertical position of the pressure plate housing 102 relative to the carrier arm 212. One desirable form of means for obtaining the desired vertical adjustment resides in the provision of a bolt 228 projecting through a slot 230 formed in a generally horizontally extending flange 232 carried by the plate 218. The bolt 228 is restrained from moving vertically relative to the flange 232 by any desired means such for example as spaced washers 234 and a pin 236 extending through the bolt 228. If the body section 222 of the housing 102 is made of relatively soft material such for example as aluminum, a bushing 238 of a hard metal may be threaded into the body section 222 to receive the bolt 228 to prevent stripping threads in the body section 222. The bolt 228 is manipulated to position the pressure plate housing 102 in a desired vertical position relative to the carrier arm 212 to adjust the contact position of the intermittence sprocket shoe 58 relative to the intermittently driven sprocket 22.

Means may be provided to vary the vertical plane of the pressure plate housing 102 relative to the carrier arm 212 to align the film shoe guide plate 44 with the film tracks 34. One desirable form of means for obtaining the desired vertical plane adjustment resides in the provision of vertically spaced bolts 240 projecting through slots 242 formed in the plate 218. The slots 242 may be arcuate shaped as illustrated to permit varying the angular relation of the pressure plate housing relative to the carrier arm to align the film shoes with the film tracks.

The slot 230 in the horizontally extending flange 232 of the plate 218 is of sufficient length to permit movement of the body section 222 and screws 240 relative to the plate 218 as the housing 102 is adjusted vertically or angularly, and the slots 242 are of sufficient width vertically to permit vertical movement of the body section on the bolt 228 to adjust the housing 102 vertically to adjust the contact position of the intermittence sprocket shoe 58 relative to the intermittently driven sprocket 22. It will be noted that the housing 102 is thus mounted on the carrier arm 212 in such a manner that it can be moved vertically or angularly to bring the cooperating parts into a desired position of alignment and to compensate wear of the parts.

The locking shaft 216 projects through an enlarged bore 244 in the body section 222 whereby movement of the housing 102 vertically or angularly relative to the plate 218 and carrier arm 212 is permitted to obtain the desired adjusted position. When the desired adjusted position has been obtained the locking screws 240 are tightened to lock the pressure plate housing 102 to the plate 218 thereby positioning the aperture 220 and plate 218 in a desired relationship with the body section 222.

This is a division of my co-pending application Serial No. 391,258, filed May 1, 1941, now Patent No. 2,374,828, issued May 1, 1945, which was a continuation in part of my earlier filed application Serial No. 250,310, filed January 11, 1939, now Patent No. 2,312,663, issued March 2, 1943.

I claim:

1. In a motion picture projector, an aperture plate, a movable carrier arm, a film shoe carrying member movable between positions adjacent and spaced from the aperture plate, connecting means between the carrier arm and film shoe carrying member comprising a plate maintained in substantially fixed horizontal and vertical positions relative to the carrier arm, and adjustable means between the plate and film shoe carrying member whereby the vertical position of the film shoe carrying member can be varied relative to the carrier arm and the angular position of the film shoe carrying member relative to the aperture plate can be varied.

2. In a motion picture projector having a film compartment, an aperture plate in the film compartment, a carrier arm in the film compartment, a shoe guide plate movable in the film compartment between an operating position adjacent the aperture plate and a threading position spaced from the aperture plate, a housing supporting the shoe guide plate, manually operable connecting means between the housing and carrier arm, and adjustable means between the manually operable means and the housing whereby the vertical and angular positions of the housing relative to the carrier arm can be varied.

3. In a motion picture projector, an aperture plate, a pair of spaced film tracks associated with the aperture plate, means including an intermittently driven sprocket to momentarily align successive film frames with the aperture in the aperture plate, a film shoe carrying member movable between an operating position adjacent the film tracks and a threading position spaced from the film tracks, a housing supporting the film shoe carrying member, a movable carrier arm, connecting means between the housing and carrier arm comprising a locking shaft, an attaching plate having spaced flanges engaging the carrier arm and having an aperture to receive the locking shaft, and adjustable means between the housing and the attaching plate comprising vertically and horizontally extending bolts projecting through slots in the attaching plate and engaging the housing whereby the horizontal and vertical positions of the housing relative to the carrier arm and the contact position of the film shoe carrying member relative to the film tracks and intermittently driven sprocket can be adjusted.

4. In a motion picture projector, an aperture plate, a pressure plate housing movable between an operating position adjacent the aperture plate and a threading position spaced from the aperture plate, a movable carrier arm, connecting means between the pressure plate housing and the carrier arm comprising a locking shaft, and adjustable means between the locking shaft and the pressure plate housing whereby the vertical and angular positions of the housing relative to the carrier arm can be varied.

5. In a motion picture projector, a plurality of horizontally extending rods, a pressure plate housing carrier arm slidably mounted on a plurality of said rods, a disk having a pin projecting therefrom adjustably mounted on the carrier arm, a male cone adjustably mounted on the disk, the male cone and pin being adapted to receive a female cone and an apertured boss of a pressure plate housing whereby the position of the housing may be adjusted vertically and horizontally.

6. In a motion picture projector having a film compartment including a fixed wall, a plurality of longitudinally extending rods mounted on the wall, an aperture plate in the film compartment, a pressure plate housing having a laterally extending female cone and an apertured boss, a pressure plate carrier arm slidably mounted on a plurality of said rods, a disk adjustably mounted on the carrier arm and having a pin projecting therefrom and adapted to engage the apertured boss, a male cone member adjustably mounted on said disk and adapted to receive the female cone of the pressure plate housing whereby the pressure plate housing may be vertically and horizontally adjusted relative to the aperture plate.

7. In a motion picture projector, an aperture plate, a carrier arm movable between positions adjacent and spaced from the aperture plate, a film shoe carrying member, a housing supporting the film shoe carrying member, connecting means between the housing and the carrier arm comprising vertically and angularly adjustable members interposed between the carrier arm and housing, and manually operable means to secure the housing to the carrier arm in an adjusted position.

8. A motion picture projector comprising an aperture plate, a carrier arm movable between positions adjacent and spaced from the aperture plate, a film shoe carrying housing, connecting means between the housing and the carrier arm comprising vertically and angularly adjustable members interposed between the carrier arm and housing, and a single readily accessible member to secure the housing to the carrier arm in any adjusted position.

9. In a motion picture projector having a film compartment, an aperture plate in the film compartment, an intermittently driven sprocket to successively align spaced film frames with the aperture of the aperture plate, a film shoe pressure plate housing, a housing carrier arm movable between operating and threading positions adjacent and spaced from the aperture plate, an intermittence sprocket shoe carried by the film shoe pressure plate housing, and means to vary the vertical and angular positions of the pressure plate housing relative to the carrier arm to adjust the vertical and angular contact positions of the intermittence sprocket shoe relative to the intermittently driven sprocket.

10. In a motion picture projector having a film compartment, an aperture plate in the film compartment, spaced film tracks associated with the aperture plate, a film shoe pressure plate housing, a housing carrier arm movable between operating and threading positions adjacent and spaced from the aperture plate, and means to vary the vertical plane of the pressure plate housing relative to the carrier arm to adjust the angular relation of the film shoe pressure plate housing relative to the film tracks.

11. In a motion picture projector having an aperture plate, spaced film tracks associated with the aperture plate, an intermittence sprocket to align spaced film frames with the aperture, a film shoe carrying member, an intermittence sprocket shoe, a housing supporting the film shoe carrying member and intermittence sprocket shoe, a housing carrier arm movable between operating and threading positions adjacent and spaced from the aperture plate, vertically adjustable means interposed between the housing and carrier arm to vary the adjusted position of the intermittence sprocket shoe relative to the intermittence sprocket, angularly adjustable means interposed between the housing and carrier arm to align the film shoe carrying member with the film tracks, and means projecting through said vertically and angularly adjustable means to secure the housing to the carrier arm in such a manner that it can be readily removed and replaced without disturbing the vertically and angularly adjusted positions.

12. A motion picture projector comprising an aperture plate having spaced film tracks associated with the aperture plate, an intermittence sprocket to align spaced film frames with the aperture, a film shoe carrying member, an intermittence sprocket shoe, a housing supporting the film shoe carrying member and intermittence sprocket shoe, a housing carrier arm movable between operating and threading positions adjacent and spaced from the aperture plate, vertically adjustable means comprising a plate having a horizontal section interposed between the housing and carrier arm and a threaded member projecting through the horizontal section to vary the adjusted position of the intermittence sprocket shoe relative to the intermittence sprocket, angularly adjustable means interposed between the housing and carrier arm comprising vertically spaced threaded members projecting through openings in a vertical portion of said plate to align the film shoe carrying member with the film tracks, and means projecting through said plate to secure the housing to the carrier arm in such a manner that it can be readily removed and replaced without disturbing the vertically and angularly adjusted positions.

RAYMOND J. MILLER.

REFERENCES CITED

The following references are of record in the file of this patent:

UNITED STATES PATENTS

| Number | Name | Date |
|---|---|---|
| 1,780,945 | Sapier | Nov. 11, 1930 |
| 1,830,158 | Dina | Nov. 3, 1931 |
| 2,192,641 | Griffin et al. | Mar. 5, 1940 |
| 2,211,827 | Kindelmann | Aug. 20, 1940 |
| 2,236,878 | Kindelmann | Apr. 1, 1941 |
| 2,140,738 | Fitz | Dec. 20, 1938 |
| 1,455,096 | Roebuck | May 15, 1923 |